US010738809B2

(12) United States Patent
Ito et al.

(10) Patent No.: US 10,738,809 B2
(45) Date of Patent: Aug. 11, 2020

(54) CONNECTION DEVICES FOR FLUIDIC DEVICES

(71) Applicant: SMC CORPORATION, Chiyoda-ku (JP)

(72) Inventors: Shinichi Ito, Toride (JP); Makoto Wada, Tsukuba (JP)

(73) Assignee: SMC CORPORATION, Chiyoda-ku (JP)

( * ) Notice: Subject to any disclaimer, the term of this patent is extended or adjusted under 35 U.S.C. 154(b) by 210 days.

(21) Appl. No.: 15/549,000

(22) PCT Filed: Jan. 22, 2016

(86) PCT No.: PCT/JP2016/051827
§ 371 (c)(1),
(2) Date: Aug. 4, 2017

(87) PCT Pub. No.: WO2016/125607
PCT Pub. Date: Aug. 11, 2016

(65) Prior Publication Data
US 2018/0023602 A1   Jan. 25, 2018

(30) Foreign Application Priority Data

Feb. 6, 2015 (JP) ................. 2015-021948

(51) Int. Cl.
*F16B 7/04* (2006.01)
*F16B 2/14* (2006.01)
(Continued)

(52) U.S. Cl.
CPC .............. *F16B 2/14* (2013.01); *F16B 7/0466* (2013.01); *F16L 41/086* (2013.01); *F16N 7/34* (2013.01); *F16N 25/00* (2013.01); *F16N 39/06* (2013.01)

(58) Field of Classification Search
CPC .......... F16B 37/145; F16B 37/14; F16B 2/14; F16B 7/04663; F16B 41/002; F16L 41/086; F16N 7/34; F16N 25/00; F16N 39/06
See application file for complete search history.

(56) References Cited

U.S. PATENT DOCUMENTS 4,521,146 A * 6/1985 Wharton ............... F16B 41/005
411/1
4,557,654 A * 12/1985 Masuda .................. F16B 37/14
411/373
(Continued)

FOREIGN PATENT DOCUMENTS

CN   201808524 U   4/2011
DE      547680 C   4/1932
(Continued)

OTHER PUBLICATIONS

Taiwanese Office Action dated May 3, 2017 in corresponding Taiwanese Patent Application No. 105103272 with partial English translation, 7 pages.
(Continued)

*Primary Examiner* — Matthew R McMahon
(74) *Attorney, Agent, or Firm* — Oblon, McClelland, Maier & Neustadt, L.L.P.

(57) ABSTRACT

Connection devices for connecting together a filter, a regulator, and a lubricator, which constitute a fluidic unit, are each provided with: a base member having a hole; a pair of first and second fastening members which are mounted to one side surface and the other side surface of the base members; and first and second holders held by the first and second fastening members. The first and second holders are engaged with the engagement protrusions of the filter, the regulator, and the lubricator, and first and second nuts are engaged with the first and second fastening members
(Continued)

through threads to connect the fluidic devices together through the first and second holders. Caps are fitted over the first holders and the first nuts.

5 Claims, 10 Drawing Sheets

(51) Int. Cl.
*F16N 7/34* (2006.01)
*F16L 41/08* (2006.01)
*F16N 25/00* (2006.01)
*F16N 39/06* (2006.01)

(56) References Cited

U.S. PATENT DOCUMENTS

| | | | | |
|---|---|---|---|---|
| 4,571,133 | A * | 2/1986 | Lindow | F16B 31/04 411/11 |
| 4,969,788 | A * | 11/1990 | Goiny | F16B 43/00 411/428 |
| 5,163,797 | A * | 11/1992 | Patti | B60B 7/00 411/372.6 |
| 5,372,392 | A | 12/1994 | Dunn et al. | |
| 5,590,992 | A | 1/1997 | Russell | |
| 5,688,091 | A * | 11/1997 | McKinlay | F16B 39/282 411/136 |
| 5,707,113 | A * | 1/1998 | Russell | B60B 7/14 301/108.4 |
| 5,775,831 | A * | 7/1998 | Mullenberg | F16B 2/14 403/337 |
| 6,079,923 | A * | 6/2000 | Ross | F16B 4/004 411/107 |
| 6,102,488 | A * | 8/2000 | Wilson | B60B 3/16 301/35.623 |
| 6,273,658 | B1 | 8/2001 | Patterson | B60B 3/16 301/37.374 |
| 6,435,791 | B1 * | 8/2002 | Bydalek | B60B 3/145 411/371.2 |
| 6,592,314 | B1 * | 7/2003 | Wilson | F16B 37/14 411/375 |
| 6,896,465 | B2 * | 5/2005 | Andersson | F16B 39/282 411/149 |
| 7,192,234 | B2 * | 3/2007 | Anderson | F16B 5/02 411/338 |
| 7,931,430 | B2 * | 4/2011 | Thrift | F16B 39/103 411/121 |
| 9,027,970 | B2 * | 5/2015 | Wada | F15B 21/048 285/406 |
| 9,206,834 | B2 * | 12/2015 | Tseng | F16B 39/02 |
| 9,673,602 | B2 * | 6/2017 | Serdynski | H02G 3/081 |
| 9,790,974 | B2 * | 10/2017 | Holt | F16B 5/0241 |
| 9,909,296 | B2 * | 3/2018 | Schuster | F16B 35/00 |
| 2003/0006097 | A1 | 1/2003 | Tomita et al. | |
| 2005/0047889 | A1 * | 3/2005 | Lee | F16B 5/0208 411/352 |
| 2005/0081931 | A1 | 4/2005 | Dezso et al. | |
| 2010/0047037 | A1 * | 2/2010 | Ishida | F16B 37/00 411/427 |
| 2014/0084585 | A1 | 3/2014 | Wada et al. | |
| 2015/0369269 | A1 * | 12/2015 | Holt | F16B 5/0241 411/108 |

FOREIGN PATENT DOCUMENTS

| | | |
|---|---|---|
| DE | 1 962 911 U | 6/1967 |
| DE | 11 2011 105 225 T5 | 2/2014 |
| EP | 0 099 487 A1 | 6/1983 |
| GB | 2 142 400 A | 1/1985 |
| JP | 60-126785 U | 8/1985 |
| JP | 3851119 B2 | 11/2006 |
| JP | 5565634 B2 | 8/2014 |
| TW | 201245584 A1 | 11/2012 |

OTHER PUBLICATIONS

International Search Report dated Feb. 23, 2016 in PCT/JP2016/051827 filed Jan. 22, 2016.
Combined Office Action and Search Report dated May 14, 2019 in Chinese Patent Application No. 201680008844.8 (with English translation), 14 pages.
Office Action dated Oct. 23, 2019 in Indian Patent Application No. 201747030636 w/English translation.
German Office Action dated Nov. 19, 2019 in German Patent Application No. 112016000629.2 , 4 pages.

* cited by examiner

CONNECTION DEVICES FOR FLUIDIC DEVICES

TECHNICAL FIELD

The present invention relates to a connection device for fluid pressure devices (fluidic devices) which is capable of communicating fluid paths of a plurality of fluid pressure devices by connecting same types or different types of fluid pressure devices, such as a filter, a regulator, and a lubricator, in parallel.

BACKGROUND ART

The present applicant has proposed a connection device which integrally connects fluid pressure devices such as a filter, a regulator, and a lubricator, which are used in a pneumatic circuit (see Japanese Patent No. 3851119). This connection device employs a structure in which a through hole is formed in a body having a hole part, an engaging member is engaged with a bolt which is inserted through the through hole, an engaging flange of the engaging member is engaged with each protrusion part provided in the vicinity of a port of two adjacent fluid pressure devices, and then the bolt is fastened so as to connect the fluid pressure devices with each other via the engaging flange.

Further, the present applicant has proposed an invention related to the connection device: "connection structure for fluid pressure devices" in which the structure is further simplified and which is suitable for downsizing (see Japanese Patent No. 5565634).

SUMMARY OF INVENTION

The present invention has been made in association with the above-mentioned propositions and an object of the present invention is to provide a connection device for fluid pressure devices which is capable of simply and quickly connecting fluid pressure devices such as a filter, a regulator, and a lubricator, and accordingly, capable of further improving assembling workability.

In order to achieve the above-mentioned object, the present invention is characterized in that a connection device for fluid pressure devices, which is disposed between one and another of fluid pressure devices and integrally connects the fluid pressure devices to each other so as to allow respective fluid paths of the one and the other of the fluid pressure devices to communicate with each other, includes a base member which includes a hole part configured to allow one fluid path and another fluid path to communicate with each other, a pair of holders which are provided respectively on one lateral surface and another lateral surface of the base member, the one lateral surface and the other lateral surface being orthogonal to an axial direction of the hole part, and each of which is provided with a pair of holding parts, the holding parts being engaged with protrusion parts which are respectively provided on the one and the other of the fluid pressure devices, and a pair of fastening members which are provided on the one lateral surface and the other lateral surface of the base member and are configured to fix the holders respectively, wherein the fastening members include a main body part and a screw part, the main body part being formed to have a substantially rectangular sectional shape and being engaged with the base member, and the screw part protruding with respect to the main body part and being inserted into the holders, and wherein to at least one of the pair of holders, the screw part is inserted and a nut is screw-engaged, and a cap is fitted.

According to the present invention, the holder and the nut are preliminarily covered by the cap to be integrated and these parts are fixed to the screw part of the fastening member. Accordingly, assembling work of these parts is facilitated, providing an advantageous effect for improving work efficiency in an assembling process.

The above-mentioned object, characteristics, and advantages will be easily understood through description of an embodiment provided below in reference to the accompanying drawings.

DESCRIPTION OF EMBODIMENTS

A connection device for fluid pressure devices according to the present invention will be described in detail below based on a preferable embodiment with reference to the accompanying drawings.

Figure 1:
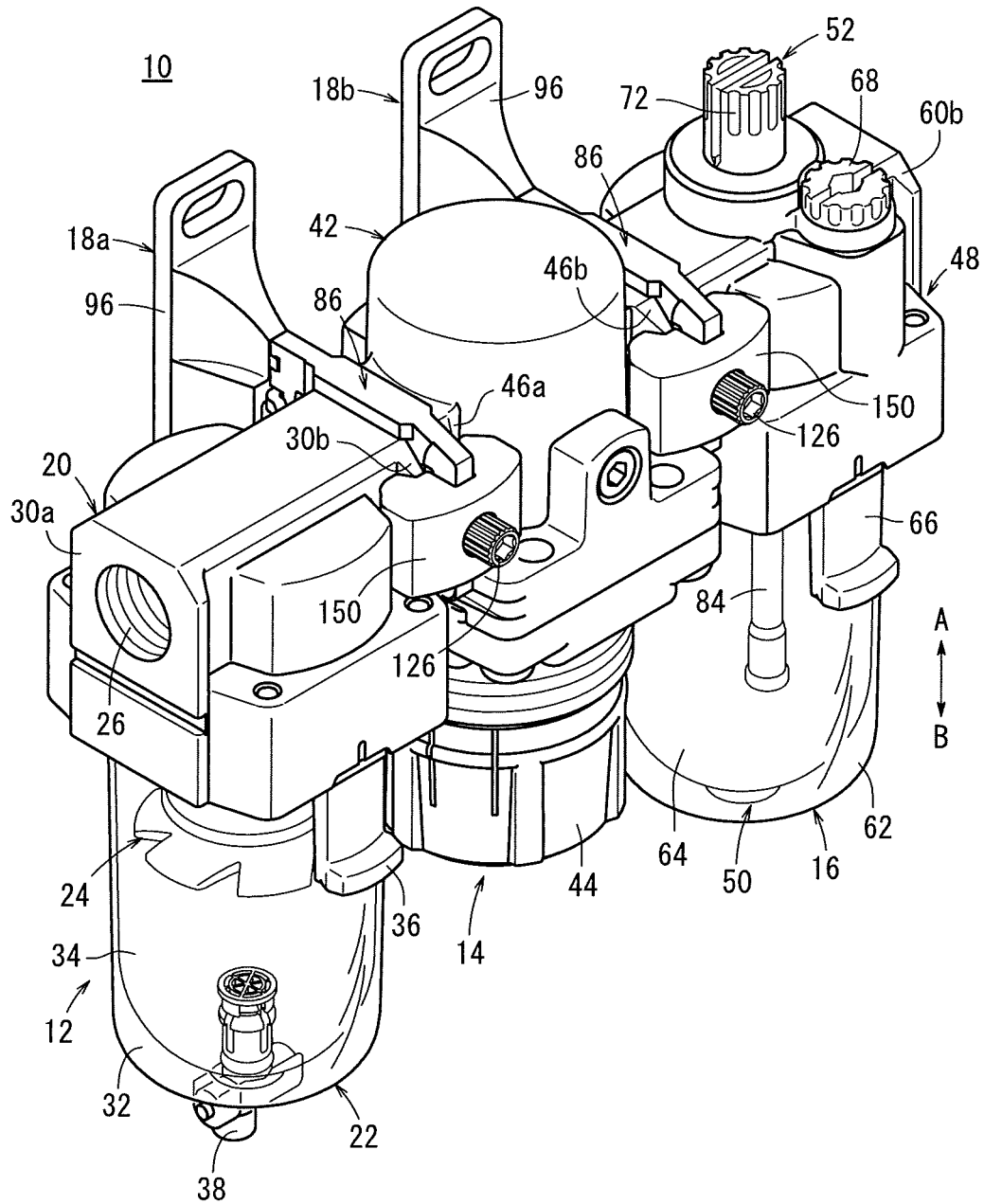
FIG. 1 is an external perspective view of a fluid pressure unit to which connection devices for fluid pressure devices according to an embodiment of the present invention are applied.

In FIG. 1, the reference numeral 10 denotes a fluid pressure unit 10 to which connection devices 18a, 18b for fluid pressure devices according to the embodiment of the present invention are applied. Here, components of the connection devices 18a and components of the connection devices 18b are identical to each other, so that one connection device 18a will be described below. For the other connection device 18b, identical reference characters will be given and detailed description of the connection device 18b will be omitted.

Figure 2:
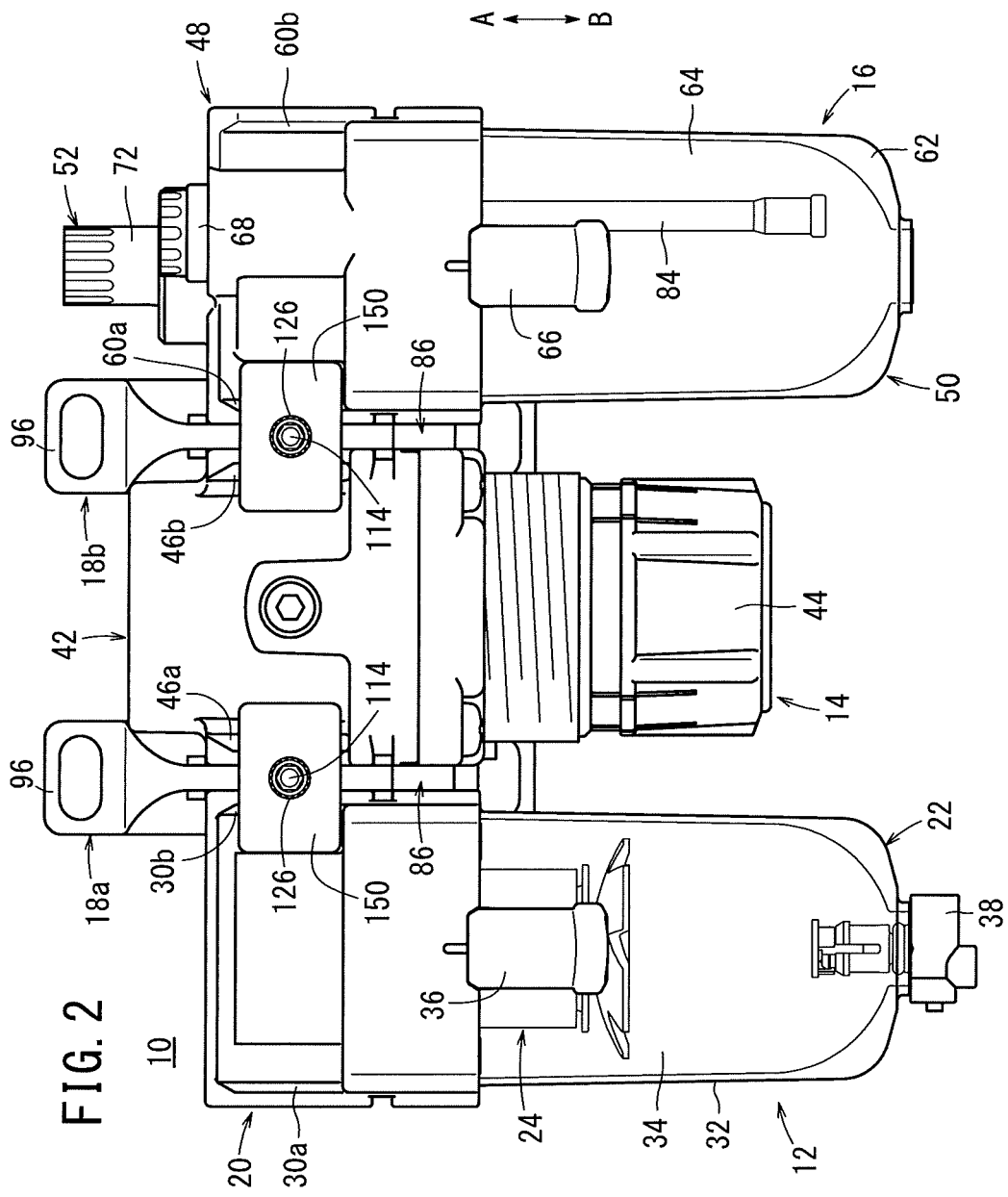
FIG. 2 is a front elevational view of the fluid pressure unit illustrated in FIG. 1.

As illustrated in FIGS. 1 and 2, this fluid pressure unit 10 includes a filter 12, a regulator 14, a lubricator 16, and the pair of connection devices 18a, 18b. The filter 12 removes dust and the like contained in pressurized fluid. The regulator 14 reduces pressure of the pressurized fluid. The lubricator 16 mixes lubricating oil with respect to the pressurized fluid. The connection device 18a is disposed between the filter 12 and the regulator 14, and the connection device 18b is disposed between the regulator 14 and the lubricator 16, thus connecting the filter 12, the regulator 14, and the lubricator 16 to each other.

The above-mentioned filter 12, regulator 14, and lubricator 16 function as fluid pressure devices having a fluid path therein to which pressurized fluid is supplied, and are arranged so that the regulator 14 is disposed between the filter 12 and the lubricator 16.

Figure 3:
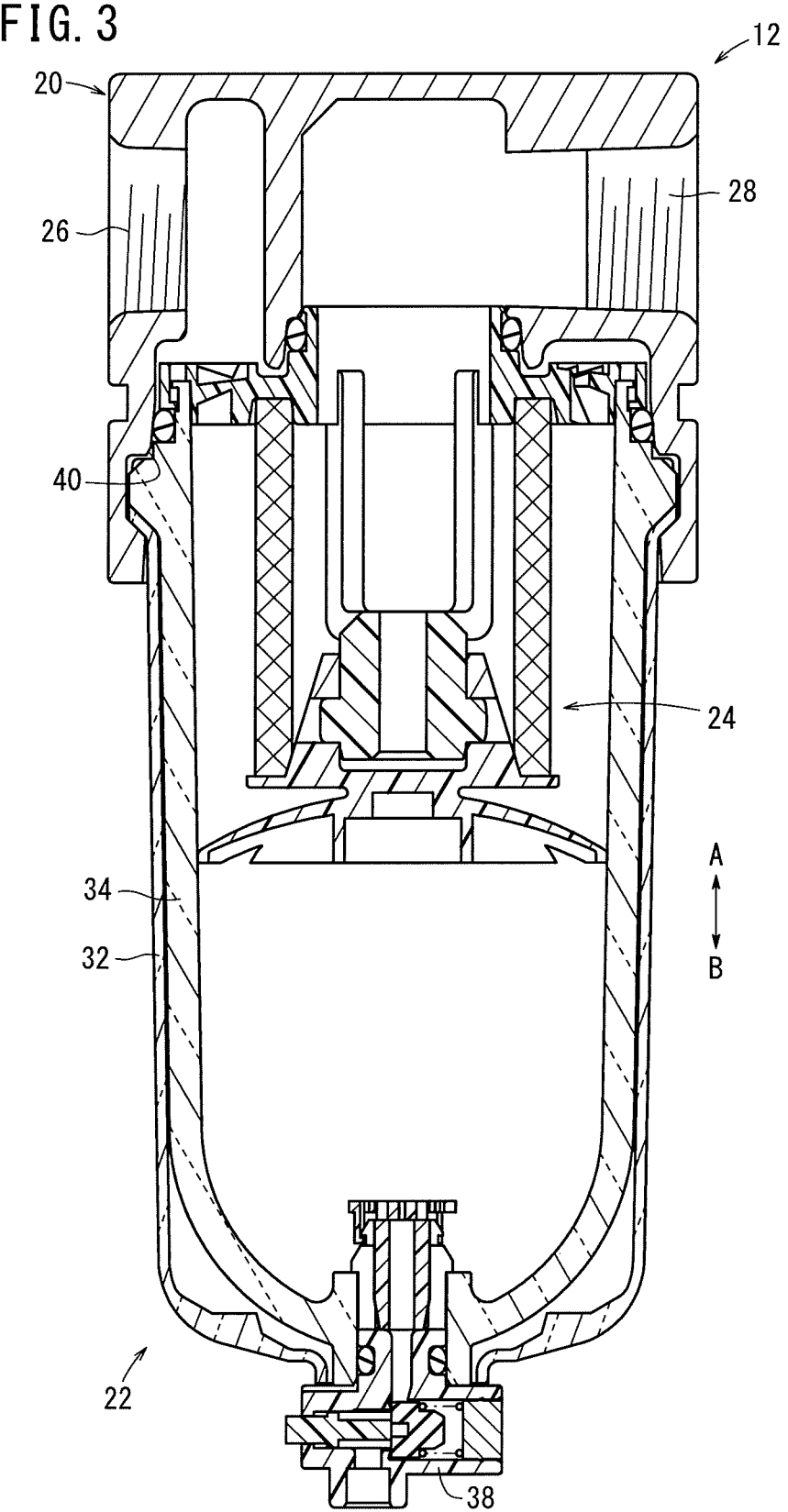
FIG. 3 is a whole sectional view of a filter constituting the fluid pressure unit of FIG. 1.

The filter 12 includes a first body 20, a case unit 22 which is connected to a lower part of the first body 20, and a filter unit 24 which is housed in the inside of the case unit 22, as illustrated in FIGS. 1 to 3.

In the first body 20, first and second ports 26, 28 to and from which pressurized fluid is supplied and discharged, are provided on respective lateral portions. The first port 26 is connected to a tube which is not shown and through which pressurized fluid is supplied. At the second port 28, the pressurized fluid supplied to the first port 26 is discharged toward the regulator 14 which will be described later.

Further, on lateral surfaces of the first body 20, a pair of engaging protrusion parts 30a and a pair of engaging protrusion parts 30b are respectively provided. The engaging protrusion parts 30a, 30b are formed to face each other on outer edge parts of end surfaces on which the first and second ports 26, 28 are respectively provided.

The case unit 22 includes an outer case 32 which is formed in a bottomed cylindrical shape, an inner case 34 which is inserted in the inside of the outer case 32, a release button 36 which is provided to be freely displaceable with respect to the outer case 32, and a drain cock 38 which is provided on bottom parts of the outer case 32 and the inner case 34.

When the case unit 22 is attached to an attachment hole 40 of the first body 20, an upper end part of the release button 36 is inserted into a concave part (not shown) which is formed on the attachment hole 40 of the first body 20. Accordingly, displacement of the case unit 22 in a rotating direction with respect to the first body 20 is regulated.

As illustrated in FIGS. 1 and 2, the regulator 14 includes a second body 42, a handle 44 which is rotatably provided on a lower part of the second body 42, and a pressure adjustment mechanism (not shown) which is capable of adjusting pressure of pressurized fluid by operating the handle 44. On lateral portions of the second body 42, a pair of ports (not shown) to and from which pressurized fluid is supplied and discharged are respectively formed. One of the ports is connected to communicate with the second port 28 of the filter 12 and pressurized fluid is supplied from the filter 12, while the other of the ports is connected to communicate with a third port 56 (which will be described later) of the lubricator 16 and the pressurized fluid is discharged.

Further, on lateral surfaces of the second body 42, a pair of engaging protrusion parts 46a and a pair of engaging protrusion parts 46b are respectively provided so that the engaging protrusion parts 46a, 46b face each other on outer edge parts of end surfaces on which a pair of ports are provided.

Further, the regulator 14 is provided with the pressure adjustment mechanism thereinside. The regulator 14 drives the pressure adjustment mechanism by rotating the handle 44 to adjust pressure of pressurized fluid which is supplied from one port to a desired pressure, and then, discharges the pressurized fluid from the other port to supply the pressurized fluid to the lubricator 16.

Figure 4:
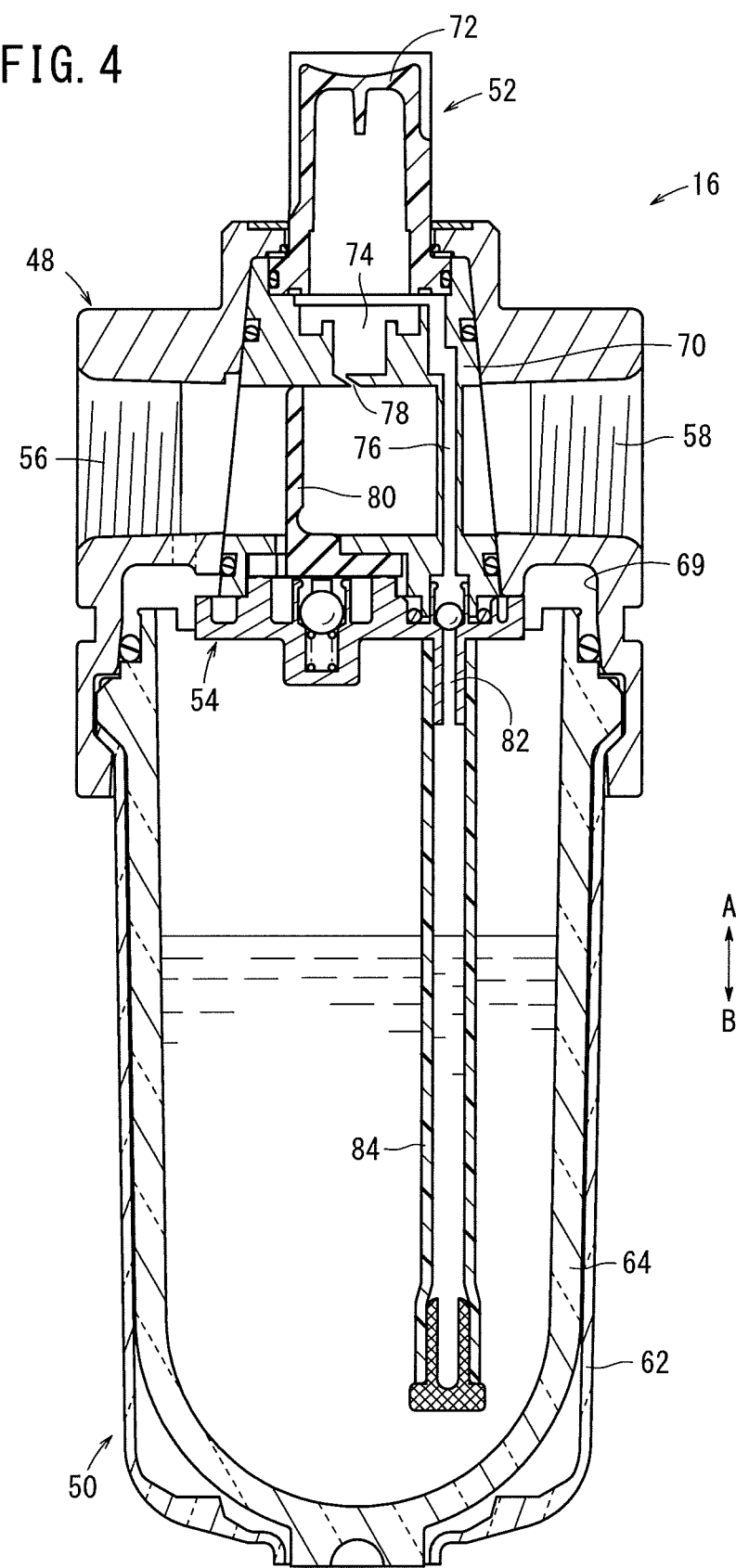
FIG. 4 is a whole sectional view of a lubricator constituting the fluid pressure unit of FIG. 1.
Figure 5:
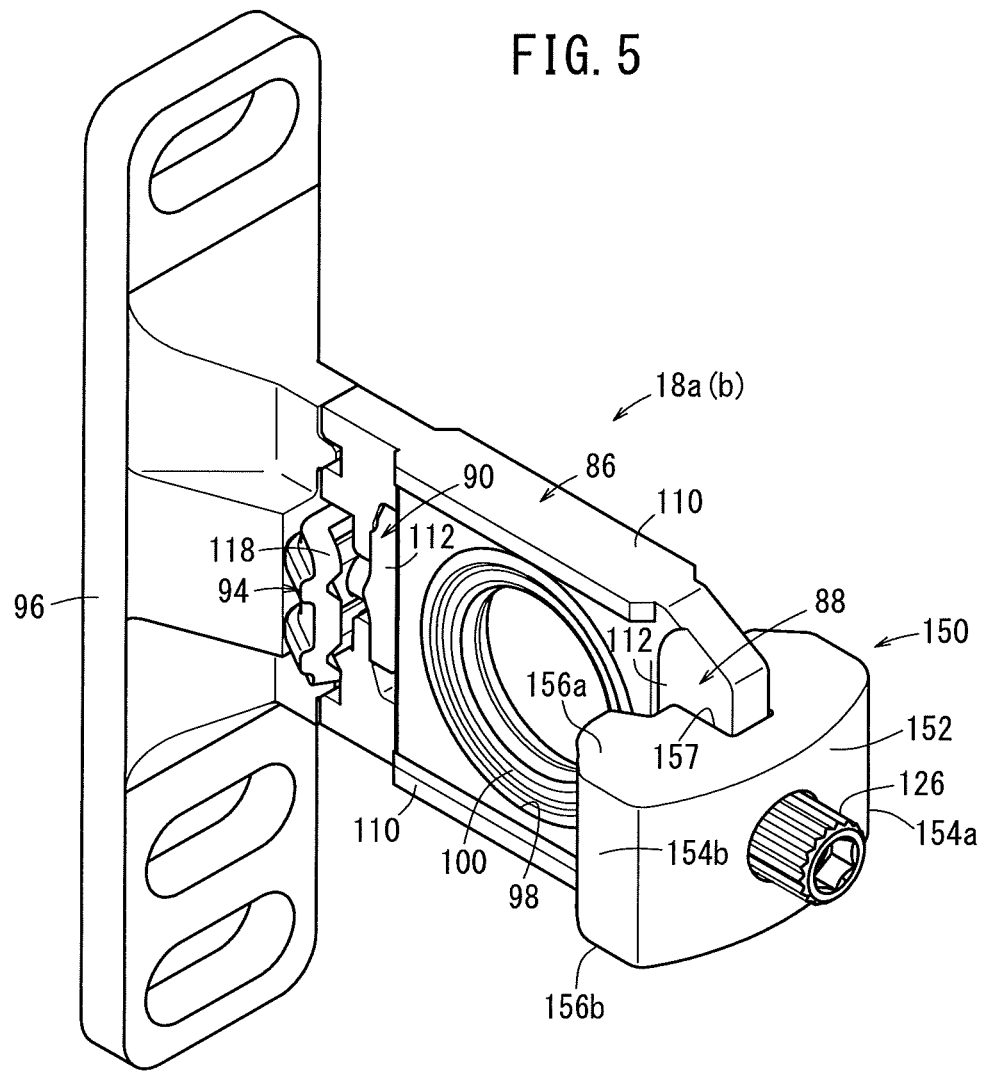
FIG. 5 is an external perspective view of the connection device illustrated in FIG. 1.

The lubricator 16 is used for dripping lubricating oil into pressurized fluid so as to supply the lubricating oil to a sliding part and the like in another fluid pressure device by using a flow of the pressurized fluid. As illustrated in FIGS. 1, 2, and 4, the lubricator 16 includes a third body 48, a case unit 50 which is connected to a lower part of the third body 48, a dripping part 52 which is inserted into the inside of the third body 48, and a holder 54 which fixes the dripping part 52 to the third body 48.

On the third body 48, the third port 56 and a fourth port 58 to and from which pressurized fluid is supplied and discharged are respectively formed on lateral portions. The third port 56 and the fourth port 58 communicate with each other via a communication path which is not shown. Here, the third port 56 is connected to the other port of the regulator 14 provided adjacently, and the fourth port 58 is connected to a tube which is not shown.

Further, on lateral surfaces of the third body 48, a pair of engaging protrusion parts 60a and a pair of engaging protrusion parts 60b (see FIG. 2) are respectively provided. The engaging protrusion parts 60a, 60b are formed to face each other on outer edge parts of end surfaces on which the third and fourth ports 56, 58 are respectively provided.

The case unit 50 includes an outer case 62 which is formed in a bottomed cylindrical shape, an inner case 64 which is inserted in the inside of the outer case 62, and a release button 66 which is provided to be displaceable with respect to the outer case 62. In the inside of the inner case 64, lubricating oil is filled through an oil supply plug 68 provided in the third body 48. Further, the case unit 50 is attached to an attachment hole 69 of the third body 48.

As illustrated in FIG. 4, the dripping part 52 includes an inner member 70 which is inserted into the inside of the third body 48 and a dripping plug 72 which is provided on an upper part of the inner member 70. In the inner member 70, a storage chamber 74 to which lubricating oil is supplied from the inner case 64 is formed. This storage chamber 74 communicates with an oil path 76 which extends downward, and lubricating oil is supplied to the storage chamber 74 through this oil path 76. On a substantially central part of the storage chamber 74, a dripping port 78 is opened downward. The oil path 76 communicates with an oil supply port 82 which is formed on the holder 54.

The holder 54 is attached to the lower part of the inner member 70 constituting the dripping part 52, and clamps and holds a part of a damper 80. Further, the holder 54 includes the oil supply port 82 which communicates with the oil path 76. This oil supply port 82 is disposed in the inside of the inner case 64 in a manner to protrude downward (the direction of the arrow B), and an oil guide tube 84 is connected to the oil supply port 82.

Further, lubricating oil filled in the inner case 64 flows toward the holder 54 through the oil guide tube 84, then is supplied to the storage chamber 74 through the oil path 76, and is dripped into a communication path from the storage chamber 74 through the dripping port 78. Thus, a desired amount of lubricating oil is mixed in pressurized fluid which flows in the communication path.

As illustrated in FIGS. 1, 2, and 5 to 7, the connection device 18a (18b) includes a base member (body) 86 which is formed in a substantially-square thin plate shape, a pair of first and second fastening members 88, 90 which are respectively provided on one lateral surface and the other lateral surface of the base member 86, a pair of first and second holders 92, 94 which are held respectively by the first and second fastening members 88, 90 and hold the fluid pressure devices, and an attachment member 96 which is connected to the other lateral surface of the base member 86.

The base member 86 is formed to have a substantially constant thickness. A hole part 98 is formed on a substantially central part of the base member 86, and a seal ring 100 made of an elastic material is attached to the hole part 98. This seal ring 100 is provided such that an outer circumferential surface of the seal ring 100 is abutted on an inner circumferential surface of the hole part 98.

Further, on one lateral surface and the other lateral surface of the base member 86, a pair of first and second concave parts 102, 104, groove parts 106, and communication holes 108 are formed. The pair of first and second concave parts 102, 104 are recessed toward the hole part 98, and the first and second holders 92, 94, which will be described later, are respectively attached to the pair of first and second concave parts 102, 104. The groove parts 106 are provided closer to the hole part 98 than the first and second concave parts 102, 104. The communication holes 108 allow communication between the groove part 106 and the first concave part 102, and between the groove part 106 and the second concave part 104.

Each of the groove parts 106 is a space whose section has a rectangular shape and which has an opening. The groove parts 106 are formed in substantially parallel to the first and second concave parts 102, 104, and the communication holes 108 are respectively formed substantially on the centers along the longitudinal direction of the groove parts 106.

Further, on an upper surface and a lower surface of the base member 86, a pair of flange parts 110 which expand in the thickness direction of the base member 86 are respectively formed. In other words, the base member 86 is formed to have wide upper and lower surfaces.

The first and second fastening members 88, 90 include a main body part 112 which is formed to have a substantially rectangular sectional shape and a screw part (shaft part) 114 which is provided on the center in the longitudinal direction of the main body part 112. The first and second fastening members 88, 90 are formed so that the screw part 114 is orthogonal to the main body part 112, and protrudes by a predetermined length.

That is, the first and second fastening members 88, 90 are formed to have a substantially T-shaped sectional shape of the main body part 112 and the screw part 114. In other words, the screw part 114 protrudes substantially from the center, which is relatively thick, of the main body part 112 in a manner to be orthogonal to the longitudinal direction of the main body part 112, and for example the screw part 114 is a stud bolt having an outer circumferential surface on which a male screw is threaded.

When the first fastening member 88 is assembled as the connection device 18a(b), the main body part 112 is inserted into the groove part 106, which is formed on one lateral surface of the base member 86, and the screw part 114 of the first fastening member 88 is inserted into the communication hole 108, such that an end of the screw part 114 protrudes into the first concave part 102. In the same manner, the main body part 112 is inserted into the groove part 106, which is formed on the other lateral surface of the base member 86, and the screw part 114 of the second fastening member 90 is inserted into the communication hole 108, such that an end of the screw part 114 protrudes into the second concave part 104.

Further, since the first and second fastening members 88, 90 are formed to have the substantially same thickness dimension as the thickness dimension of the base member 86, the first and second fastening members 88, 90 do not protrude in the thickness direction of the base member 86 in a state that the first and second fastening members 88, 90 are attached.

The first and second holders 92, 94 each include a flat part 116 which is formed on a substantially central part, and first and second holding parts 118, 120 which are formed respectively on both end parts of the flat part 116 and are inclined by a predetermined angle so that the first and second holding parts 118 and 120 mutually approach. On the first and second holders 92, 94 each, ribs 119, 121 which bend from the first holding part 118 through the second holding part 120 are formed in a protruded manner. The flat parts 116 are respectively inserted into the first and second concave parts 102, 104 of the base member 86, and the first holding parts 118 and the second holding parts 120 are respectively arranged and abutted on the engaging protrusion parts 30b of the filter 12 and the engaging protrusion parts 46a of the regulator 14.

Bolt holes 122 to which the screw parts 114 of the first and second fastening members 88, 90 are loosely fitted respectively are formed substantially on the centers of respective flat parts 116. The first holder (retainer) 92 is held with respect to the screw part 114 of the first fastening member 88 such that a first nut 126 is screw-engaged in a state that the screw part 114 of the first fastening member 88 is inserted through the bolt hole 122. Meanwhile, the second holder 94 is held with respect to the screw part 114 of the second fastening member 90 such that a second nut 128 is screw-engaged in a state that the screw part 114 of the second fastening member 90 is inserted through. On an outer circumference of a head part 127, which has a cylindrical shape, of the first nut 126, a concave-convex part is formed along an axial direction. Meanwhile, on an inner circumferential surface of the first nut 126, a screw hole 130 in which a wrench, which is not shown, is to be inserted is formed. Here, the reference numeral 132 denotes a flange part which is integrated with the head part 127.

Figure 8:
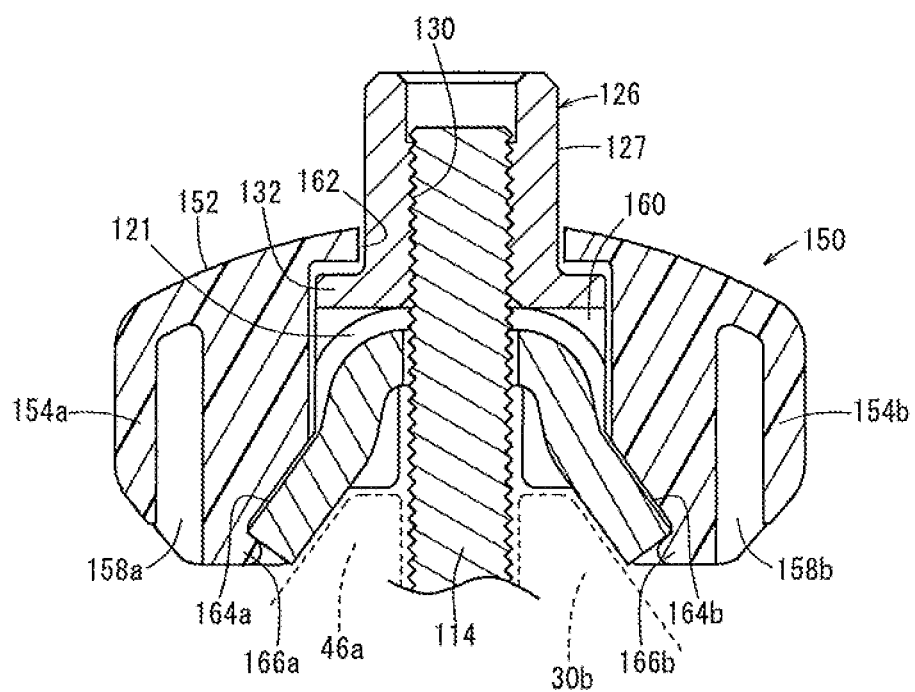
FIG. 8 is a longitudinal sectional view of main parts in an assembling state of a fastening member, a holder, a nut, and a cap which constitute the connection device illustrated in FIG. 5.

In this case, in the present embodiment, a retainer cap (referred to below as a cap) 150 is fitted so that the cap 150 surrounds the first holder 92 and a part of the first nut 126. As understood from FIGS. 6 and 8, the cap 150 includes a curved surface part 152 which is formed of a smooth surface, a first lateral wall part 154a and a second lateral wall part 154b which are respectively provided on both end parts of the curved surface part 152, and a first plane part 156a and a second plane part 156b which are bridged between the curved surface part 152 and the first and second lateral wall parts 154a, 154b. On the first plane part 156a and the second plane part 156b, a cutout part 157 having a shape obtained by combining a rectangular shape and a trapezoid shape is formed, and one end part of the base member 86 is inserted into the cutout part 157 in assembly. The first and second lateral wall parts 154a, 154b are actually thick. Therefore, lightening holes 158a, 158b are formed respectively on the first lateral wall part 154a and the second lateral wall part 154b so as to reduce the weight of the first and second lateral wall parts 154a, 154b.

Further, in the cap 150, a chamber 160 having a substantially rectangular shape is formed from the first plane part 156a through the second plane part 156b, and the chamber 160 communicates with the outside thereof through a through hole 162 which is formed on the curved surface part 152 and has a circular shape. A diameter of the through hole 162 is larger than that of the head part 127 of the first nut 126. Meanwhile, on inner surfaces, which are on the opposite side from the through hole 162, of the first and second lateral wall parts 154a, 154b, inclined surfaces 164a, 164b which are opened toward the outside in a manner to mutually spread are respectively provided. On end parts of the inclined surfaces 164a, 164b, seat parts 166a, 166b which protrude inward are respectively provided.

It is preferable that the cap 150 may be an integrally molded article which is integrally formed with a material slightly having an elastic force, and it is further preferable that the cap 150 may be made of metal or hard resin.

The fluid pressure unit 10 to which the connection devices 18a, 18b according to the embodiment of the present invention are applied is basically structured as described above. Subsequently, assembly of the connection device 18a will be described.

Figure 6:
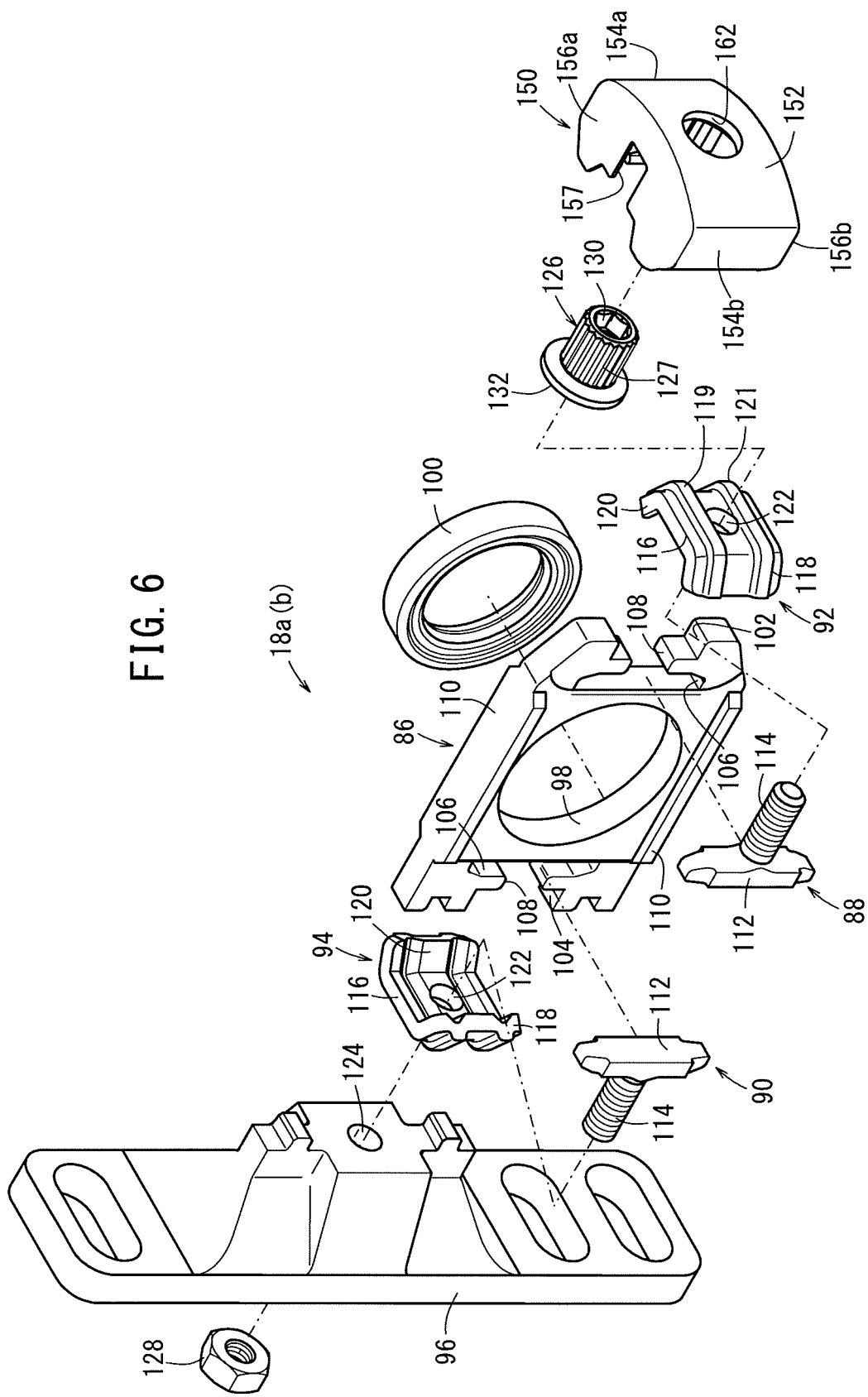
FIG. 6 is an exploded perspective view of the connection device of FIG. 5.
Figure 7:
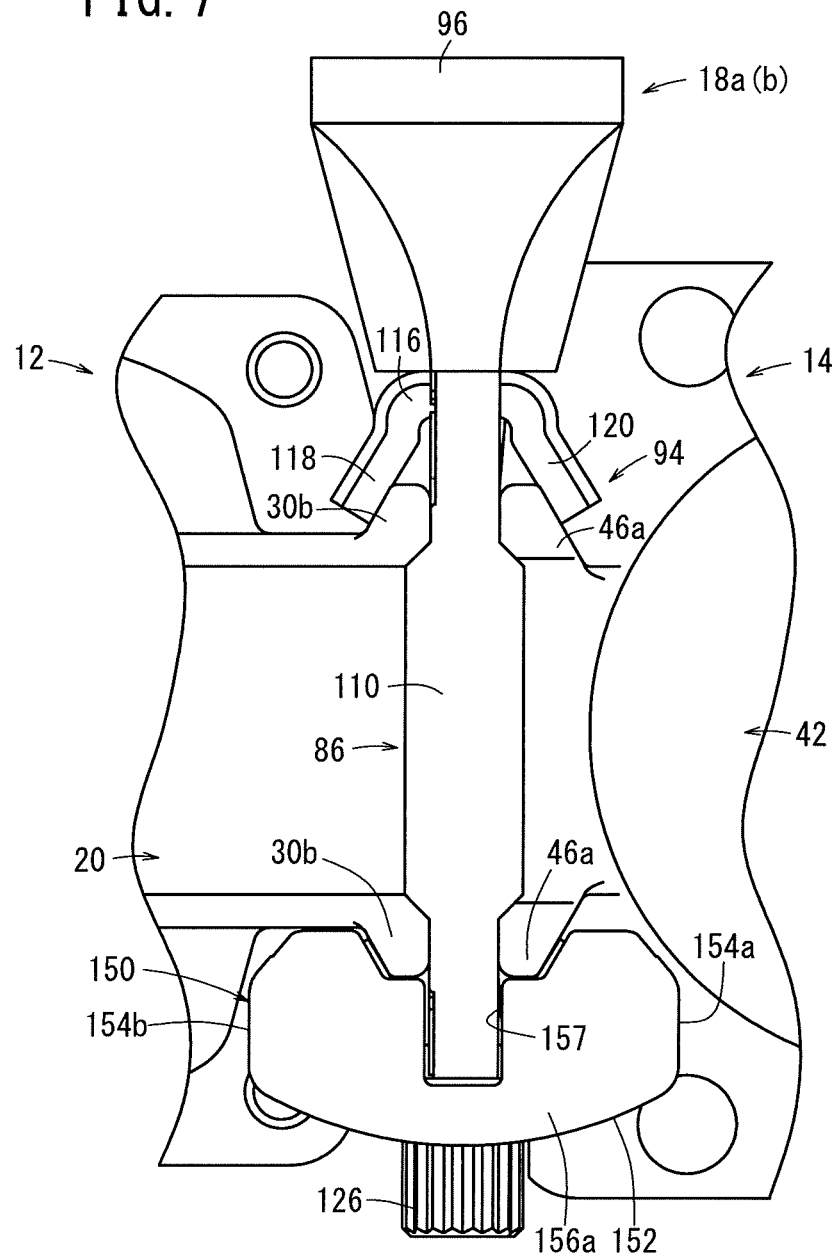
FIG. 7 is a plan view of main parts in a state that the filter and a regulator are connected by using the connection device illustrated in FIG. 5.

First, as the connection device 18a illustrated in FIG. 6, the seal ring 100 is inserted into the hole part 98 of the base member 86, while the main body parts 112 of the first and second fastening members 88, 90 are respectively inserted into the groove parts 106 of the base member 86, the screw parts 114 are respectively inserted into the communication holes 108 along the axial direction of the hole part 98. Accordingly, such a state is produced that the screw parts 114 of the first and second fastening members 88, 90 protrude respectively into the first and second concave parts 102, 104 of the base member 86.

Meanwhile, the first nut 126 is housed in the inside of the chamber 160 of the cap 150. At this time, through the housing operation, the first lateral wall part 154a and the second lateral wall part 154b mutually slightly spread by using elasticity of the cap 150, and the ends of the first and second holding parts 118 and 120 of the first holder 92 are rendered to seat on the seat parts 166a, 166b of the cap 150. In this housing, the head part 127 of the first nut 126 is exposed to the outside from the through hole 162 of the cap 150. Accordingly, the cap 150 and the first holder 92 are integrated with each other.

Subsequently, the flat parts 116 of the first and second holders 92, 94 are inserted respectively into the first and second concave parts 102, 104 while inserting the screw parts 114 of the first and second fastening members 88, 90 respectively through the bolt holes 122 of the first and second holders 92, 94. Thereafter, the screw hole 130 of the first nut 126 is screw-engaged with respect to the screw part 114 of the first fastening member 88. At this time, the head part 127 of the first nut 126 is exposed to the outside from the through hole 162 of the cap 150 as described above, so that screwing can be easily performed via the head part 127 of the first nut 126. In this case, when the first nut 126 is screwed, the first fastening member 88 is pulled via the screw part 114 thereof. In other words, the cap 150 is rendered to engage with the flange part 132 of the first nut 126, so that the cap 150 is displaced toward the base member 86 with the first holder 92 which is abutted on the inclined surfaces 164a, 164b. As a result, the inner surface of the first holding part 118 and the inner surface of the second holding part 120 of the first holder 92 are rendered to be in pressure contact with the engaging protrusion part 30b of the first body 20 and the engaging protrusion part 46a of the second body 42. This pressure contact effect spreads the first holding part 118 and the second holding part 120 of the first holder 92 with a resilient force to push the inclined surfaces 164a, 164b of the cap 150, further strengthening integration of the cap 150 and the first holder 92. The screw part 114 of the second fastening member 90 is inserted through a through hole 124 which is formed on a substantially central part of the attachment member 96, and then, the second nut 128 is screw-engaged with the screw part 114. Accordingly, the other lateral surface of the base member 86 is connected to the attachment member 96 and the first holder 92 is held (fixed) on one lateral surface side of the base member 86 at the same time.

In this case, it is favorable to preliminary perform arrangement so that the engaging protrusion parts 30b on the second port 28 side of the filter 12 and the engaging protrusion parts 46a of the regulator 14 closer to the port connected to the second port 28 are made face each other, the base member 86 is held between the filter 12 and the regulator 14, and the second port 28 and the port are substantially aligned with the hole part 98.

Meanwhile, after the first and second holding parts 118, 120 of the second holder 94 are engaged respectively with the engaging protrusion parts 30b, 46a, the second nut 128 is screwed to be pulled toward the base member 86 along the screw part 114. Accordingly, the second holder 94 moves toward the base member 86. As a result, the first and second holding parts 118, 120 of the second holder 94 move in a mutually-approaching direction, and the engaging protrusion part 30b of the filter 12 and the engaging protrusion part 46a of the regulator 14 are strongly held to be mutually connected.

At this time, the second port 28 of the filter 12 and one port of the regulator 14 mutually communicate via the hole part 98 of the base member 86, and at the same time, the seal ring 100 prevents pressurized fluid which flows through the hole part 98 from leaking to the outside.

Here, the assembling method in the case where the regulator 14 and the lubricator 16 are connected by the connection device 18b is substantially same as the above-described assembling method, so that the detailed description thereof will be omitted. Further, an assembling order of the filter 12, the regulator 14, and the lubricator 16 is not limited to the order of this description.

As described above, in the present embodiment, the filter 12, the regulator 14, and the lubricator 16 which are fluid pressure devices can be connected to each other by using thrust along the axial direction of the screw parts 114 generated when the first and second holders 92, 94 are fastened by the first and second nuts 126, 128. Therefore, the filter 12, the regulator 14, and the lubricator 16 can be strongly connected and a force can be equally applied with respect to adjacent fluid pressure devices via the first and second holders 92, 94. Consequently, the fluid pressure devices can be connected to each other in a well-balanced manner.

At this time, since the first nut 126 and the cap 150 are integrated in advance, the bolt hole 122 of the first holder 92 and the screw hole 130 of the first nut 126 can be easily matched or aligned in the axial direction, facilitating the assembling work. Further, the curved surface part 152, the first lateral wall part 154a, the second lateral wall part 154b, and further, the smooth surfaces formed on the first plane part 156a and the second plane part 156b of the cap 150 surround a part of the first nut 126, so that dust is hardly accumulated.

In addition, in the fluid pressure unit 10 to which the connection devices 18a, 18b which are assembled as described above are applied, pressurized fluid is supplied from a pressurized fluid supply source, which is not shown, through a tube to the first port 26 of the filter 12, then is introduced to the inside of the case unit 22 from the first port 26, and passes through a filter element of the filter unit 24. Accordingly, dust and the like contained in the pressurized fluid are favorably removed. Subsequently, the pressurized fluid ascends inside the filter unit 24 and is discharged as clean pressurized fluid from the second port 28.

Further, the pressurized fluid is supplied to one port (not shown) in the regulator 14 through the hole part 98 of the connection device 18a, and is adjusted to have a preset pressure value by the handle 44, and then the pressurized fluid subjected to the pressure adjustment is supplied through the other port to the lubricator 16 which is integrally connected by the connection device 18b.

This pressurized fluid subjected to the pressure adjustment is supplied from the third port 56 of the lubricator 16 to flow toward the fourth port 58, and part of this pressurized fluid is supplied to the inside of the case unit 50 at the same time. Therefore, lubricating oil is pushed by the pressurized fluid supplied into the inner case 64, flows toward the holder 54 (the direction of the arrow A) through the oil guide tube 84, then is supplied to the storage chamber 74 through the oil path 76, and is dripped with respect to the pressurized fluid through the dripping port 78. Accordingly, after the lubricating oil is mixed in the pressurized fluid by a predetermined amount when the pressurized fluid passes through the inside of the inner member 70, the pressurized fluid is supplied to another fluid pressure device, which requires lubricating oil, through a tube from the fourth port 58.

Figure 9:
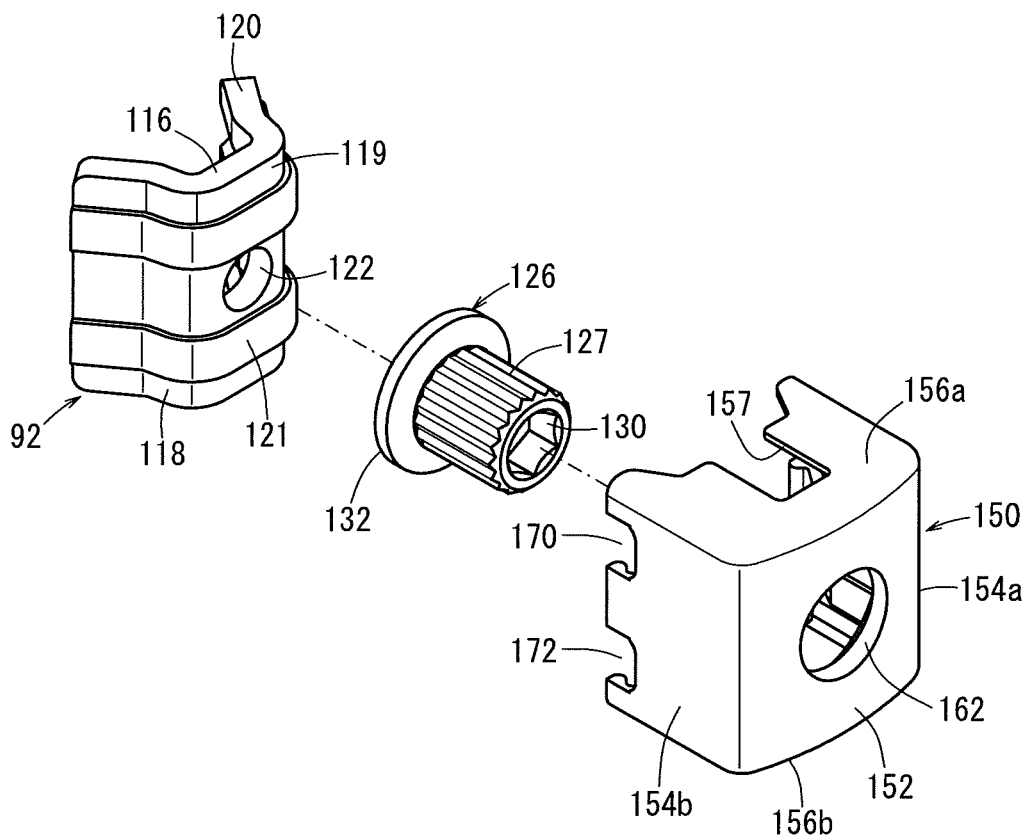
FIG. 9 is an exploded perspective view of a modification of the connection device illustrated in FIG. 5.
Figure 10:
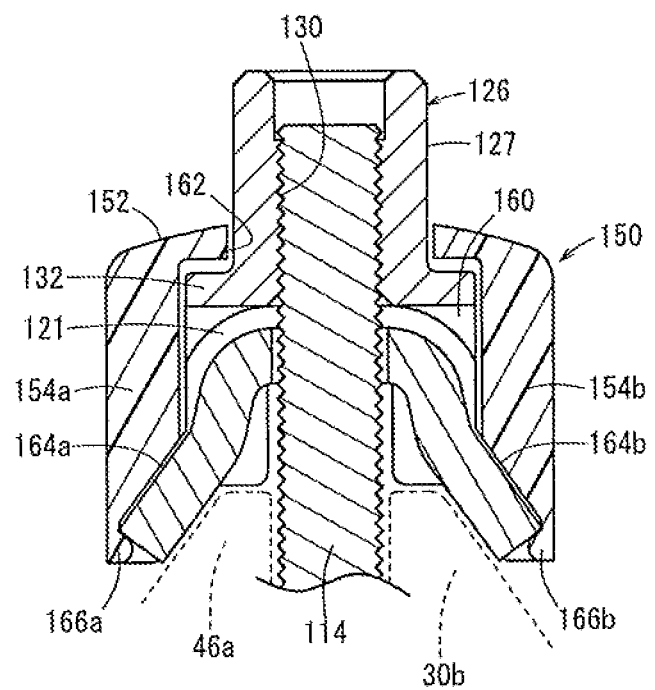
FIG. 10 is a longitudinal sectional view of main parts of the modification of the connection device of FIG. 9.

Here, needless to say, the connection device for fluid pressure devices according to the present invention is not limited to the above-described embodiment and may employ various types of structures without departing from the gist of the invention. For example, as a modification illustrated in FIGS. 9 and 10, the cap 150 is further slimmed by forming lightening parts 170, 172 on the outer sides of the first lateral wall part 154a and the second lateral wall part 154b without forming the lightening holes 158a, 158b on the cap 150, thus being able to achieve further downsizing of the connection device.

The invention claimed is:

1. A connection device for fluid pressure devices which is disposed between one and another of the fluid pressure devices and integrally connects the fluid pressure devices to each other so as to allow respective fluid paths of the one and the other of the fluid pressure devices to communicate with each other, the connection device comprising:
 a base member which includes a hole part configured to allow one fluid path and another fluid path to communicate with each other;
 a pair of holders which are provided respectively on one lateral surface and another lateral surface of the base member, the one lateral surface and the other lateral surface being orthogonal to an axial direction of the hole part, and each of the holders is provided with a central part having an opening and a pair of holding parts provided to opposite sides of the central part, the holding parts having distal ends located opposite the central parts and having surfaces that are mutually inclined such that the inclined surfaces of the respective holding parts are separated farther from one another at the distal ends than at the central part, the holding parts being engaged with protrusion parts which are respectively provided on the one and the other of the fluid pressure devices;
 a pair of fastening members which are provided on the one lateral surface and the other lateral surface of the base member and are configured to fix the holders respectively, wherein each of the fastening members includes a main body part and a screw part, the main body part being formed to have a substantially rectangular sectional shape and being engageable with the base member, and the screw part protruding with respect to the main body part and being insertable into the opening provided in the respective holder;
 a nut which is screw engageable with the screw part of each of the fastening members; and
 a cap into which a respective nut and holder are inserted,
 wherein the cap includes a portion integrating the respective nut and holder with the cap when the nut is not screw engaged with the screw part of the respective fastening member,
 wherein the cap comprises a chamber in which the respective holder and nut are housed and a through hole which communicates with the chamber, and wherein the portion integrating the respective nut and holder with the cap comprises:
 inclined surfaces of the chamber which are opened toward an outside, the inclined surfaces of the chamber being on an opposite side of the cap from a surface in which the through hole is formed, further comprising inclined seats at the respective inclined surfaces of the chamber, wherein the inclined surfaces of the chamber are inclined to be separated farther from one another as viewed in a direction toward said seats, and wherein the distal ends of the holding parts of the respective holder are abutted on the inclined seats.

2. The connection device for the fluid pressure devices according to claim 1, wherein a head part of the respective nut extends through the through hole to a location outside of the cap.

3. The connection device for the fluid pressure devices according to claim 1, wherein the respective nut includes a flange part in the chamber, and wherein the portion integrating the respective nut and holder with the cap is engaged with the flange part, with a head part of the respective nut extending through the through hole to a location outside of the cap.

4. The connection device for the fluid pressure devices according to claim 1, wherein the cap is an integrally molded article which is made of resin.

5. The connection device for the fluid pressure devices according to claim 1, wherein the inclined surfaces of the chamber are inclined to match an inclination of the surfaces of the holding parts.

* * * * *